(12) United States Patent
Benney et al.

(10) Patent No.: US 8,656,944 B2
(45) Date of Patent: Feb. 25, 2014

(54) COMBINED METERING VALVE AND PRESSURE REGULATING VALVE

(75) Inventors: Paul M. Benney, Bloomfield, CT (US); Justin R. Morini, Westfield, MA (US)

(73) Assignee: Hamilton Sundstrand Corporation, Windsor Locks, CT (US)

( * ) Notice: Subject to any disclaimer, the term of this patent is extended or adjusted under 35 U.S.C. 154(b) by 878 days.

(21) Appl. No.: 12/248,956

(22) Filed: Oct. 10, 2008

(65) Prior Publication Data

US 2010/0089470 A1    Apr. 15, 2010

(51) Int. Cl.
  *F16K 31/12*    (2006.01)
  *F16K 31/36*    (2006.01)
  *F15B 13/00*    (2006.01)

(52) U.S. Cl.
  USPC .......................................... 137/497; 137/560

(58) Field of Classification Search
  USPC .................. 137/497, 115.07, 115.19, 115.25, 137/625.5, 115.15, 115.21, 115.23, 560, 137/614.2, 630.19
  See application file for complete search history.

(56) References Cited

U.S. PATENT DOCUMENTS

| | | | | |
|---|---|---|---|---|
| 1,776,877 A | * | 9/1930 | Yonkese | 244/135 C |
| 2,482,401 A | * | 9/1949 | Chandler | 261/69.1 |
| 2,786,482 A | * | 3/1957 | Bayer | 137/118.04 |
| 3,128,783 A | * | 4/1964 | Cowles et al. | 137/115.06 |
| 3,139,892 A | * | 7/1964 | McRoberts | 60/39.281 |
| 3,217,726 A | * | 11/1965 | Rohweder et al. | 137/101 |
| 3,465,778 A | * | 9/1969 | Kast | 137/115.1 |
| 4,206,901 A | | 6/1980 | Williams | |
| 4,327,763 A | * | 5/1982 | Budzich | 137/115.07 |
| 4,521,948 A | | 6/1985 | Laue | |
| 4,798,329 A | * | 1/1989 | Mesenich | 239/5 |
| 4,971,005 A | | 11/1990 | Dyer et al. | |
| 5,147,154 A | | 9/1992 | Scott | |
| 5,251,663 A | | 10/1993 | Christianson | |
| 5,435,288 A | | 7/1995 | Schmal | |
| 5,732,730 A | | 3/1998 | Shoemaker et al. | |
| 5,934,766 A | | 8/1999 | Feigel | |
| 6,116,273 A | | 9/2000 | Tarr | |
| 6,126,138 A | | 10/2000 | Tsai | |
| 6,289,919 B1 | | 9/2001 | Sledd | |
| 6,583,525 B2 | | 6/2003 | Dyer | |
| 2003/0093187 A1 | * | 5/2003 | Walker | 701/1 |

FOREIGN PATENT DOCUMENTS

EP    0106781    4/1984
EP    0886054    12/1998

OTHER PUBLICATIONS

European Search Report for European Patent Application No. 09252394.3 completed Oct. 9, 2013.

* cited by examiner

*Primary Examiner* — Dinh Q Nguyen
*Assistant Examiner* — Chee-Chong Lee
(74) *Attorney, Agent, or Firm* — Carlson, Gaskey & Olds, PC

(57) ABSTRACT

A valve element combines a metering function and a pressure regulating function. A valve housing houses a metering valve. The metering valve is movable by a control to meter an amount of fluid delivered from an inlet to an outlet. A pressure regulating valve is received within the valve housing and is supplied with a pressure delivered into the inlet on a first face, and a pressure downstream of the outlet on a second face. The pressure regulating valve acts to regulate the pressure drop across the metering valve to ensure accurate fluid metering.

6 Claims, 1 Drawing Sheet

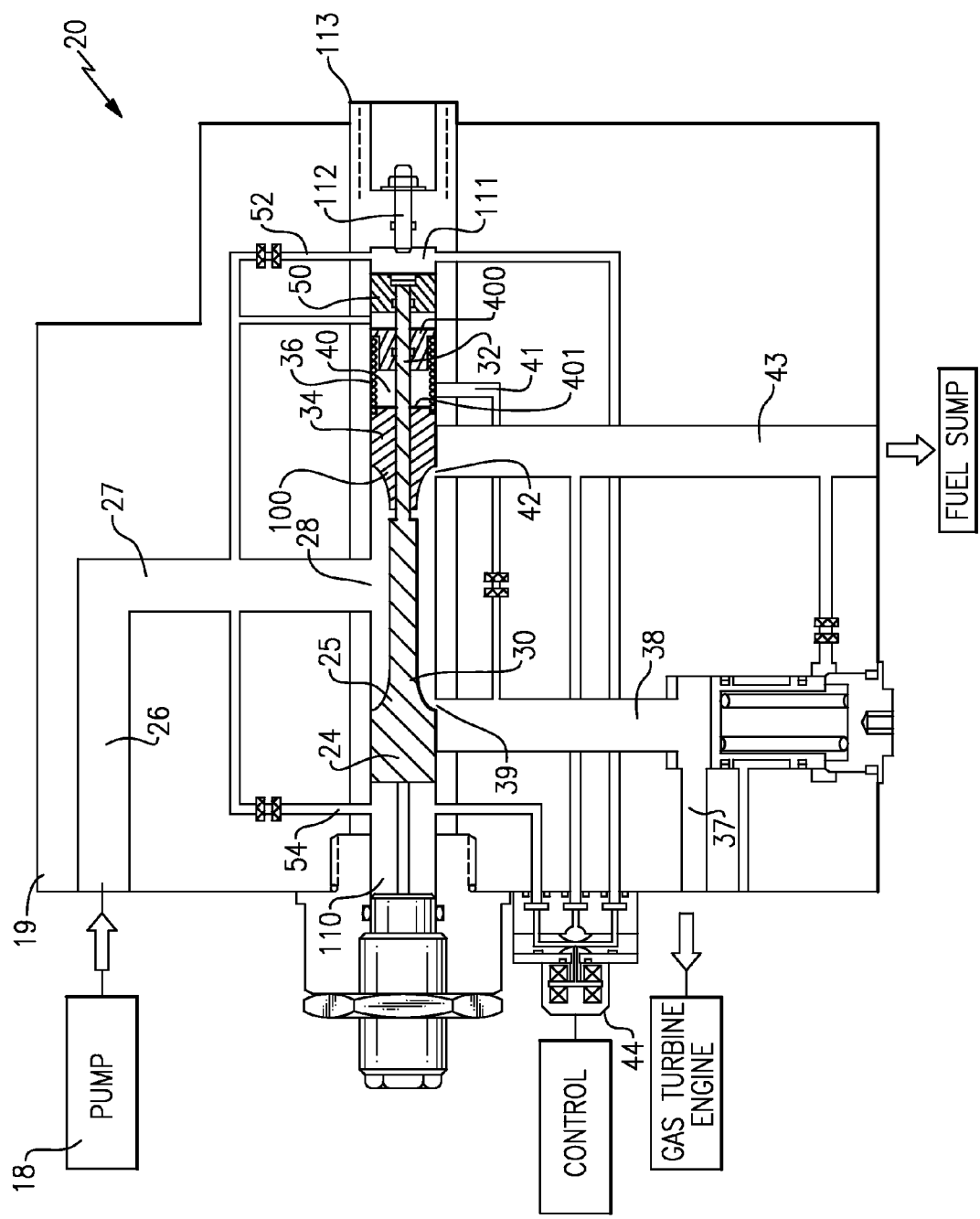

COMBINED METERING VALVE AND PRESSURE REGULATING VALVE

BACKGROUND OF THE INVENTION

This application relates to a single valve that combines the function of a metering valve and a pressure regulating valve.

Modern fluid delivery systems are often provided with a metering valve and pressure regulating valve, which together control the amount of fluid that is delivered to a user. As an example, a fuel supply system for supplying fuel to an engine will include such a metering valve and pressure regulating valve. Fuel is delivered from a positive displacement pump to the metering valve. The position of the metering valve determines the size of a variable flow opening (metering valve window) in the flow path from the pump to engine. The pressure regulating valve senses pressures upstream and downstream of the metering valve window and varies the amount of flow it bypasses back to the pump inlet to maintain the metering window pressure drop at a constant value. The metering valve position is controlled by an engine control. With a fixed pressure drop maintained across the metering window, a selected amount of fuel will be scheduled to the engine as a function of metering valve position.

In the prior art, these two functions have been provided by two separate valves.

SUMMARY OF THE INVENTION

A valve element combines a metering function and a pressure regulating function. A valve housing houses the combined valve element. The metering valve received within the valve housing is movable by a control to meter an amount of fluid delivered from an inlet to an outlet. A pressure regulating valve is received within the valve housing and is supplied with a pressure delivered into the inlet on a first face, and a pressure downstream of the outlet on a second face. The pressure regulating valve acts to regulate the pressure drop between the inlet and the outlet.

These and other features of the present invention can be best understood from the following specification and drawings, the following of which is a brief description.

BRIEF DESCRIPTION OF THE DRAWINGS

FIG. 1 shows a valve incorporating both the metering valve function and the pressure regulating valve function.

DETAILED DESCRIPTION OF THE PREFERRED EMBODIMENT

FIG. 1 shows a fluid circuit 20 which includes a positive displacement pump 18 delivering a pressurized fluid into a valve housing 19. Valve housing 19 incorporates a first valve body 24, which has an enlarged land 25 that serves to control the amount of fluid passing from a line 26, a line 27, and into a chamber, opening or cavity 28 in a valve housing. The land 25 controls how much of this fluid is delivered to an outlet port 39 and line 38 leading to a user such as a gas turbine engine at line 37. The land 25 is positioned relative to the port 39 by an electronic servo valve 44 that selectively regulates high pressure fluid at opposed ends of the valve 24. The electronic servo valve is known, and takes in high pressure fluid from the line 43, and selectively delivers it to the chambers 110 or 111 by positioning the electronic servo valve components. Taps 52 and 54 receive pressurized fluid from line 27. As shown, a chamber 110 receives pressurized, fluid from tap 54, as does an opposed chamber 111 from the tap 52. By selectively regulating pressurized fluid to these two ends, a piston 50 will see the pressure in the chamber 111, while the land 25 sees the pressure in the chamber 110. Thus, the difference in pressure between chamber 110 and 111 will cause the valve to move from right and left as shown in FIG. 1 to selectively control the size of the port 39 leading to the line 38. The fluid which is not delivered into the port 39 is returned through a bypass opening 42, and to a bypass line 43 returning to the sump. This is the metering valve function.

A thin portion 30 of the valve 24 provides an open space such that the fluid from the opening 28 can reach the ports 39 or 42.

The pressure regulating function is provided by a valve element 34, which is biased to the left by a spring 36. The spring 36 reacts off a housing piece 400. Valve 34 rides along a thin pin 32 which is formed as part of the valve 24. Thus, the valves 34 and 24 move along co-axial axes. A chamber 40 is provided with a tap 41 to the fluid in the line 38, and thus sees the pressure downstream of the metering valve. A left hand side of the valve 34 sees the pressure in the chamber 28, and thus the high pressure fluid delivered by the pump 18 acts on a forward face 100 of the valve element 34, while the downstream pressure in chamber 40 acts on the opposed face 401. If the pressure on the face 100 delivered by the pump 18 is too high relative to the downstream pressure delivered to the opposed face, then the valve 34 will be driven to the right as shown in FIG. 1, and more fluid will be bypassed into the bypass line 43 through port opening 42. This will lower the pressure within chamber 28. On the other hand, if the pressure seen on the face 100 is too low relative to the downstream pressure in the chamber 40, then the valve will be driven to the left as shown in FIG. 1, and will further restrict the port opening 42 such that the pressure in chamber 28 will increase. Valve element 34 will continually maintain a constant pressure difference between chamber 28 and line 38.

Adjustable body 113 controls the pre-load of spring 36. Any movement of body 113 to the left will increase the spring load of spring 36 and subsequently increase the pressure difference between cavity 28 and line 38. A movement of body 113 to the right will have the opposite effect which will decrease the pressure difference between cavity 28 and line 28.

Further details of the combined valve include a stop 112, which will limit movement of the valve 24 to the right which creates a minimum port opening of port 39.

The present invention thus provides a single valve that provides both valving functions, and reduces the size and complexity of the prior art fuel deliver systems.

Although an embodiment of this invention has been disclosed, a worker of ordinary skill in this art would recognize that certain modifications would come within the scope of this invention. For that reason, the following claims should be studied to determine the true scope and content of this invention.

What is claimed is:

1. A valve combining a metering function and a pressure regulating function comprising:
   a valve housing to house a metering valve, said metering valve being movable by a control to meter an amount of fluid delivered from an inlet to an outlet;
   a pressure regulating valve being moveable relative to said metering valve, said pressure regulating valve being received within the valve housing and being supplied with a pressure delivered into said inlet on a first face, and a pressure downstream of said outlet on a second face, and said pressure regulating valve acting to regulate a pressure difference between the inlet and outlet;

said control including an electronic control for selectively moving the metering valve;

said electronic control controlling a difference in pressure of fluid at opposed sides of said metering valve;

said pressure regulating valve being slidable along a portion of said metering valve, such that said pressure regulating valve and said metering valve move along coaxial axes;

wherein said metering valve has a first enlarged land which meters the flow of a fluid from the inlet through the outlet; and wherein said pressure regulating valve controls an amount of fluid that is delivered from the inlet to a second outlet leading to a bypass line.

2. The valve as set forth in claim 1, wherein a spring also biases said pressure regulating valve in combination with the pressure downstream of said outlet.

3. The valve as set forth in claim 1, wherein said valve is part of a fuel control system for delivering fuel to an engine.

4. The valve as set forth in claim 1, wherein said portion of said metering valve is a thin pin.

5. A fuel supply system comprising:

a pump for delivering fuel to an outlet, said outlet communicating with a valve housing, said valve housing including an inlet to deliver fluid from the pump into a valve chamber;

a metering valve movable within said valve chamber, said metering valve being positioned by a control to move a land, said land metering the amount of fluid from said inlet passing through an outlet;

a pressure regulating valve movable relative to said metering valve, and within said valve chamber, said pressure regulating valve controlling the amount of fluid passing from said inlet to a bypass outlet, and said pressure regulating valve being biased by a pressure downstream of said inlet in said valve chamber on a first face, and a pressure downstream of said outlet on an opposed face, with a spring further biasing said pressure regulating valve in combination with said downstream pressure;

said control including an electronic control for selectively moving the metering valve;

said electronic control controlling a difference in pressure of fluid at opposed sides of said metering valve; and said pressure regulating valve being slidable along a portion of said metering valve, such that said pressure regulating valve and said metering valve move along coaxial axes.

6. The fuel supply system as set forth in set forth in claim 5, wherein said portion of said metering valve is a thin pin.

* * * * *